May 8, 1962    R. A. SHUTTLEWORTH    3,033,073
PHOTOCONDUCTIVE LOCATING DEVICE
Filed June 2, 1959

*INVENTOR.*
ROSE A. SHUTTLEWORTH
BY Harry M. Saragovitz
ATTORNEY

United States Patent Office 3,033,073
Patented May 8, 1962

3,033,073
PHOTOCONDUCTIVE LOCATING DEVICE
Rose A. Shuttleworth, Matawan, N.J., assignor to the United States of America as represented by the Secretary of the Army
Filed June 2, 1959, Ser. No. 817,684
1 Claim. (Cl. 88—14)
(Granted under Title 35, U.S. Code (1952), sec. 266)

The invention described herein may be manufactured and used by or for the Government for governmental purposes, without the payment of any royalty thereon.

This invention relates to photoconductive apparatus and particularly to such apparatus adapted for locating the position of a light beam.

There is a great need for electronic measuring and recording of linear displacement of light. Heretofore, linear displacement of a light source has been measured by photographic means or by manual tracking. These methods have proven to be expensive, time consuming, inaccurate and cumbersome.

One object of this invention is to provide photoconductive apparatus wherein the geometry of the photoconductive element may be used to measure the linear travel of a light beam. Light, as herein referred to, embraces all wavelengths which may be used to energize all devices to be described.

In an example of practice illustrative of this invention, the photoconductive device comprises a direct current biased photoconductive element having thereon a pair of non-parallel opposing electrodes. A moving light source is focused on the area between the electrodes. In application, the element or the light source may travel. In either application, the device exhibits a current output which varies with the position of the light image on the element.

For a more detailed description of the invention, together with other and further objects thereof, reference is had to the following description taken in connection with the accompanying drawing, in which like reference characters refer to similar parts, wherein.

Figure 1:
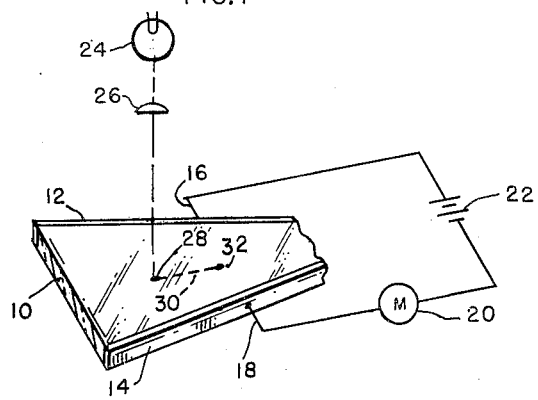
FIG. 1 illustrates a schematic representation of a photoconductive device in accordance with the invention.

Referring now to the drawing, FIG. 1 illustrates a photoconductive device, in accordance with the present invention including a body such as a slab 10 made of photoconducting material, and having at least two opposing lateral sides in non-parallel arrangement. Spaced metal electrodes 12 and 14 are affixed on said sides of slab 10 respectively, having leads 16 and 18, respectively, from said electrodes 12 and 14. A source of direct potential is applied through conductors 16 and 18 to bias slab 10, and a recording meter 20 may be provided in circuit with direct current source 22 to measure the output current as hereinafter explained. The bias voltage derived from source 22 sets up a field within slab 10 in a manner as is well known in the art. A light beam from a suitable source of light 24 which transmits light for energizing slab 10 is directed thereon through lens 26 to a point 28. Lens 26 may be either a spherical lens to focus a point image between electrodes 12 and 14 on slab 10, or a cylindrical lens directing a line image, parallel to the applied biased field, onto slab 10 and contacting both electrodes. Slab 10 may consist of a light sensitive semiconductor such as cadmium sulfide, cadmium selenide or lead selenide. Such crystal may be chosen in accordance with the incident radiation to which it responds best and forms no part of the present invention.

The present invention is based on the well known phenomena that the resistance of photoconductive substances decreases when subjected to incident light radiation. The energy of the incident radiation is absorbed to create electron-hole pairs, which under the influence of an externally applied voltage will move to regions of opposite polarity, giving rise to the photocurrent. Since the applied voltage is constant, the electric field strength between the electrodes will vary inversely with the distance therebetween. Thus, if a beam of light is directed to a point 28 on slab 10 and then moved, along the dotted linear path 30 between the electrodes, to a point 32 where the electrodes 12 and 14 are closer together, the current output will increase in accordance with the linear displacement of the light image. The geometric arrangement of slab 10 and electrodes 12 and 14 is such that the electric field strength at point 32 is greater than the electric field strength at point 28. Hence, the electron-hole pairs are subjected to varying electric fields and their transit time will vary accordingly, resulting in a variation of the output current. Similarly, the displacement of the light image along the linear path, in the opposite direction where the electrodes are further apart will provide a decrease in output current. By the above described method, the invention may be used to locate or track the position or motion of a linearly moving light source.

Figure 2:
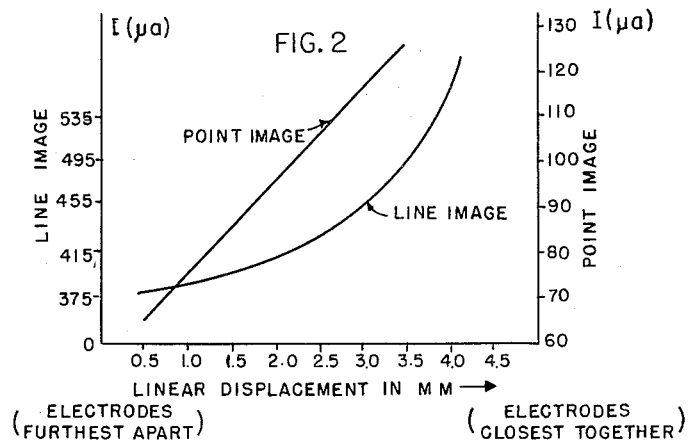
FIG. 2 is an explanatory curve showing the response of the photoconductive device of FIG. 1.

The typical operating characteristics of devices of the construction illustrated in FIG. 1 and above described are shown in FIG. 2. The data of FIG. 2 are taken from an experimental model and are of value chiefly to illustrate the relationship of output current to linear displacement of the light image. Two curves are shown, one for a point image and the other for a line image. A comparison of the curves indicates that for the slab 10 shown in FIG. 1, the current response is linear for a point image and exponential for a line image.

Figure 3:
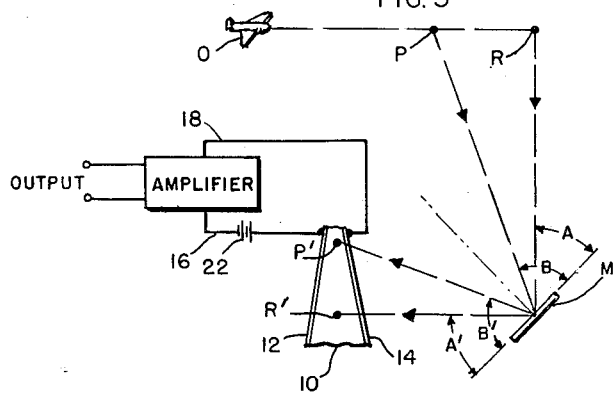
FIG. 3 is a pictorial illustration using one of the devices herein to be described.

Referring now to FIG. 3, there is shown a pictorial representation in which the invention may be used as an automatic tracking or firing mechanism applied to a flying object. A flying object O moves linearly from point P to point R, emitting, or reflecting, visible radiation which impinges upon the reflecting surface M, the plane of which may be set parallel to the horizon or at any suitable angle. The reflected beam strikes the light sensitive surface of body 10. It is obvious that the distance P' and R', on body 10, is directly proportional to the distance PR traveled, A, B and A' and B' being the angles of incidence and reflection, respectively. The output current, thus, is directly proportional to the distance traveled by the moving object, and suitably amplified, may be connected to a firing control mechanism or to a recorder for tracking.

Another application is to detect the deflection of a galvanometer coil, the photoconductive element 10 being mounted on the galvanometer suspension.

Although FIG. 1 shows the preferred embodiment of the invention, it is obvious that other forms of the invention can be made, thus, for example, in lieu of a block of light sensitive semiconductor material, an insulating base having a semiconductive photosensitive surface layer thereon can be used. Furthermore, spaced electrodes 12 and 14 may be printed or plated directly on the photosensitive surface of body 10, or on the photosensitive layer described above, and the electrode disposition thereon may have any geometrical configuration. In addition, the electrodes may be applied on body 10 in the form of a repetitive pattern to produce a waveform replica, or may be symmetrically arranged thereon with respect to an imaginary line on said body 10.

While there has been described what is at present considered to be the preferred embodiments of the invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

A photoconductive device for measuring the linear displacement of the point image of a light source comprising an homogeneous body of photoconductive material responsive to said light source, said body having a pair of opposing lateral surfaces in non-parallel arrangement, discrete electrodes completely covering each of said lateral surfaces and in contact therewith, a source of constant direct current bias applied between said electrodes, a meter in circuit with said bias source, whereby when said point image is directed linearly along a longitudinal path on said face intermediate said electrodes the output of said meter measures the location of said point image along said linear path at any one time.

References Cited in the file of this patent
UNITED STATES PATENTS

| | | |
|---|---|---|
| 2,816,283 | Steele | Dec. 10, 1957 |
| 2,845,546 | Purcell et al. | July 29, 1958 |
| 2,877,284 | Shultz | Mar. 10, 1959 |
| 2,879,405 | Pankove | Mar. 24, 1959 |

OTHER REFERENCES

Wallmark: "Photocell Measures Light Direction," published in "Electronics," July 1, 1957, pages 165–167.